United States Patent [19]
Ruysink

[11] Patent Number: 5,868,339
[45] Date of Patent: Feb. 9, 1999

[54] HOLDER FOR PREVENTING THE INCIDENTAL ROTATION OF FILM MATERIAL ON A ROLE

[75] Inventor: Cornelis Johannes Jacobus Ruysink, Harderwijk, Netherlands

[73] Assignee: Kodak Polychrome Graphics, Norwalk, Conn.

[21] Appl. No.: 764,407

[22] Filed: Dec. 11, 1996

[51] Int. Cl.[6] .................................................. G03B 23/02
[52] U.S. Cl. .................................. 242/348.4; 242/588.5; 242/588.6
[58] Field of Search ................................ 242/348, 348.4, 242/588.5, 588.6

[56] References Cited

U.S. PATENT DOCUMENTS

| | | |
|---|---|---|
| 2,171,800 | 9/1939 | Mann . |
| 2,948,575 | 9/1960 | Kallman et al. ............................ 312/39 |
| 3,944,148 | 3/1976 | Freeman et al. . |
| 4,398,814 | 8/1983 | Muylle et al. ................... 242/348.4 X |
| 4,403,845 | 9/1983 | Buelens et al. .................. 242/348.4 X |
| 4,756,418 | 7/1988 | Johanson et al. ....................... 206/397 |
| 4,763,786 | 8/1988 | Benz ................................ 242/588.6 X |
| 4,830,305 | 5/1989 | Güggi et al. . |
| 4,903,835 | 2/1990 | Beery .................................. 242/588.5 |
| 5,156,354 | 10/1992 | Robertson et al. . |
| 5,261,623 | 11/1993 | Dominesey et al. ............. 242/348.4 X |
| 5,275,346 | 1/1994 | Dominesey et al. .................. 242/348.4 |
| 5,314,134 | 5/1994 | Harris et al. ..................... 242/588.6 X |

FOREIGN PATENT DOCUMENTS

| | | |
|---|---|---|
| 0 198 124 A1 | 10/1986 | European Pat. Off. ......... G03B 27/58 |
| 0 348 192 A3 | 6/1989 | European Pat. Off. ......... G03B 27/58 |
| 0 572 338 A1 | 5/1993 | European Pat. Off. ......... G03B 27/58 |
| 0 598 668 A1 | 10/1993 | European Pat. Off. ......... G03B 27/58 |
| 0 624 820 A1 | 10/1993 | European Pat. Off. .......... G03C 3/00 |
| 2 555 560 A1 | 11/1983 | France ........................... B65H 75/24 |
| P 20 02 215 | 1/1970 | Germany . |

OTHER PUBLICATIONS

Research Disclosure No. 163, Nov. 1977.

*Primary Examiner*—Donald P. Walsh
*Assistant Examiner*—William A. Rivera
*Attorney, Agent, or Firm*—Ratner & Prestia

[57] ABSTRACT

A holder for preventing the incidental rotation of film material on a roll, comprising at least two parts which fit together, with a roll of film material on a roll core therein, having a lip of which extends outside the holder, and a flange having a support plate and a protruding part, which protruding part engages with the roll core, and the anti-incidental rotation mechanism undetachably mounted on the flange.

6 Claims, 3 Drawing Sheets

HOLDER FOR PREVENTING THE INCIDENTAL ROTATION OF FILM MATERIAL ON A ROLE

The invention pertains to a holder for film material on a roll, comprising at least two parts which fit together, inside which is a roll of film material on a roll core, one lip of which roll extends outside the holder, and a flange which comprises a support plate and a protruding piece, which protruding piece engages with the roll core.

Such holders are generally known for, e.g., the holding of rolls of light-sensitive material for the graphic industry. This light-sensitive material is also sensitive to mechanical and chemical influences, such as folding, scratching, and sticking together. The material is also exposed to atmospheric influences. In order to avoid these deleterious influences, the film material must preferably be kept and made available in the rolled-up state. If the roll of film material, as is commonly done, is placed loose in the holder as regards rotation about its central line, this roll will twist somewhat back and forth during storage and transport manipulations. In the longer run, this leads to the loosening of at least the outermost layer(s) of the roll of film material. Thus, the roll works itself loose at the outside. The loosened outermost layers of film material will work themselves loose in the holder until they come to lie against the rectangular inside of the holder, which can produce folds in these layers generally in the area of corners of the holder.

Furthermore, the loosened layers make the roll no longer easy to unroll for purposes of use, since the roll gets jammed in the holder by the loosened layers.

In order to counteract this process, there are known means which can protect the roll against turning for as long as the protective action is not interrupted by external intervention. One should not select, as the protective means, a protective means such as a bolt or adhesive which is applied from the outside or the inside, respectively, because the packaging must remain impervious to light at all times, in the case of the former, and glue will touch the light-sensitive material, in the case of the latter.

There are known protective means which are applied during the assembly of the holders and the contents in absence of light and whose protective action can be interrupted, in which case the broken means of protection remains behind in the holder. The major drawback of this type of solution is, however, that portions of the broken means of protection remain behind and loose in the holder and therefore they can brush against the surface of the light-sensitive roll material, thereby producing scratches. Another drawback is that these means involve a complex design and, furthermore, a costly production process.

In addition, this type of protective means cannot be reused, since the structural connection is broken, so that the holder with flanges and/or the roll cannot be reused for a subsequent roll of film material. This makes the holder relatively expensive with respect to the roll of film material.

Furthermore, for a good action of the protective means, it must be ensured that the protective means after the breaking of the protection action can never obstruct the free rotation of the roll of film material. Insofar as the protective means after the breaking of the protection action contains various loose pieces, these can, for example, engage with each other and/or come to lie between the roll core and the protruding part of the flange, which could partially or fully obstruct the free rotation of the roll.

The purpose of the invention is to prevent the unrolling of a roll of film material prior to its use, wherein the above-mentioned drawbacks are avoided. The purpose is accomplished according to the invention in that a protective means is undetachably applied to the flange and the protective means is secured such that it can tilt in the direction of rotation of the roll.

Due to the fact that the protective means, both before and after use, or before and after the breaking of the protection action, forms an integral whole with the static parts of the holder outside the area of the film material, the film material cannot be damaged by parts of the protective means.

Due to the fact that the protective means is undetachably connected to the flange, the latter cannot move in the holder after the breaking is done, so that damaging of the film material is prevented. A practical form of embodiment is achieved when the protective means is secured in the roll such that it can tilt in the direction of rotation.

One preferred embodiment is that in which the protective means comprises a base whereby it is fastened to the flange, a tilting part, and a hinge connection by which the tilting part is fastened to the base, and a cavity which can accommodate the tilting part. The protection action is relieved by exerting a force on one lip of the outermost layer of film material on the roll that is greater than the resisting force of the hinge connection by which the tilting part is secured to the base. In practice, said lip during storage and transport is stuck to the outside of the holder, so that the breaking force cannot be exerted accidentally. The resisting force of the hinge connection can be easily adjusted to be large enough by selecting a certain size of hinge connection.

The cavity which accommodates the bent tilting piece ensures that the free rotation of the roll of film material is not impeded by the protective means after the breaking of the protection action. For this, preferably, the depth of this cavity is at least as great as the width of the transverse part of the tilting piece. For the sake of a simple fabrication, such a cavity is preferably provided on both sides of the base, so that each flange is symmetrical and, therefore, a single mold type will suffice, on the one hand, and the flange can be used as both left and right flange in the assembly, on the other.

A preferred embodiment is that in which the protective means is mounted on the protruding part of the flange. In this way, the protective means is entirely outside the area of the film material, namely, inside the cavity of the roll core, where the protruding part engages with the roll core, while the implementation of this protective means requires only very little adaptation of the means of production, in particular, the mold for the flange, and, thus, little additional production costs.

For an even better engagement of the roll core with the tilting piece, the latter piece preferably comprises at least one cutting edge, whereby the tilting piece cuts into the material of the roll core prior to the removal of the protection. This measure does not increase the resisting force of the hinge connection, but it enhances the reliability of the breaking of the protective means.

The engagement of the roll core with the tilting piece is further improved if the transverse end of the tilting piece has two cutting edges, which are placed in parallel at a distance from each other and basically lie on the same radius with respect to the protruding piece. The resisting force of the-protective means is somewhat increased here in that the cutting edges are not in line with the hinge connection and the breaking of the protection in this way is coupled with, at first, a deeper cutting of one of the cutting edges into the material of the roll core and, subsequently, the need to push the tilting piece about a tilting point, or so-called dead point, both of which effects require extra force.

The present invention also pertains to the flange for engaging with a roll core in a holder according to the present invention, which flange comprises: a support plate and a protruding piece, on which a protective means is undetachably mounted.

The invention shall now be illustrated more closely by means of the enclosed drawings, which incorporate one sample embodiment.

Figure 1:
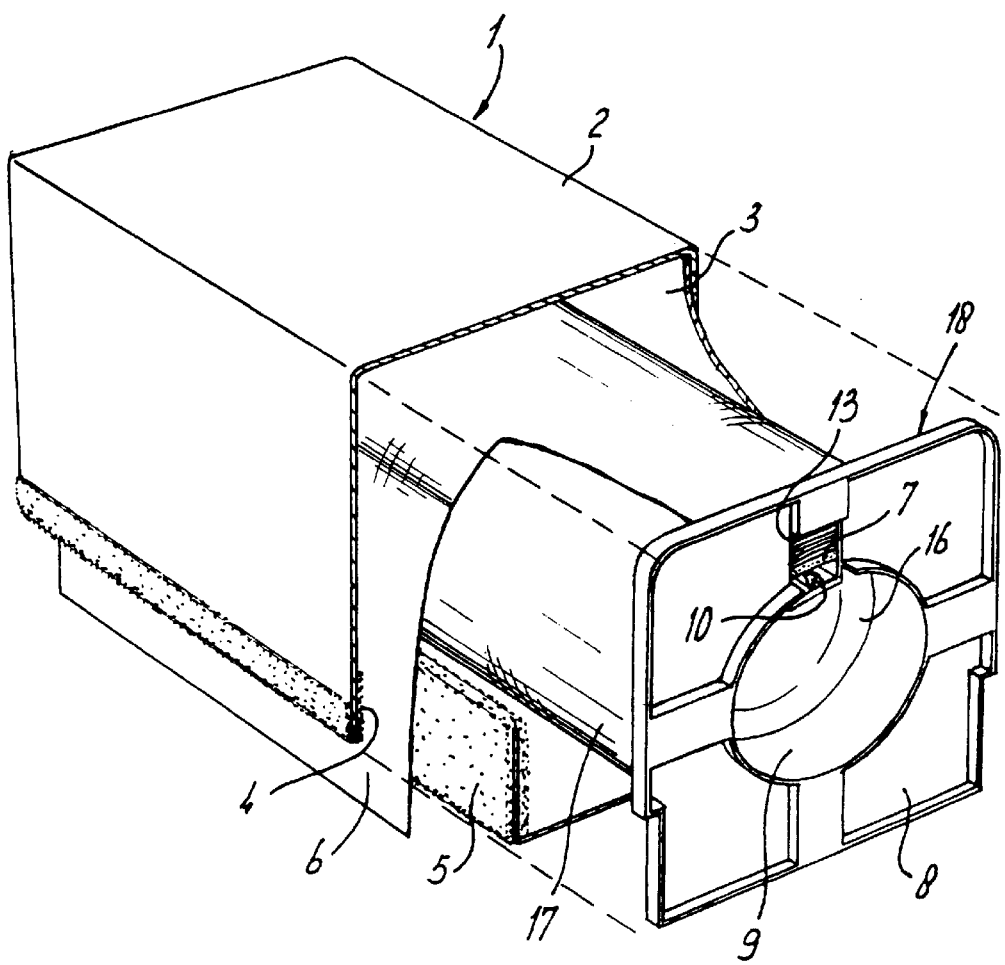
FIG. 1 shows in perspective view a holder according to the present invention.

In the embodiment per FIG. 1, the holder 1 for film material on a roll, for example, light-sensitive material for the graphic industry, comprises at least two parts 2 and 3, which fit together, in which there is a roll 17 of film material on a roll core 7, one lip 6 of which roll 17 extends outside the holder 1 via a slit, the edges of which are provided with felt 4 and 5 to produce a lightproof lock, and a flange 18, which comprises a support plate 8 and a protruding piece 9, which protruding piece engages with the roll core 7 on the inside.

The protective means 10 according to the invention can be seen in FIG. 1 through the recess 13, which is made in the support plate 8 of the flange 18 for sake of an easier fabrication.

Figure 2:
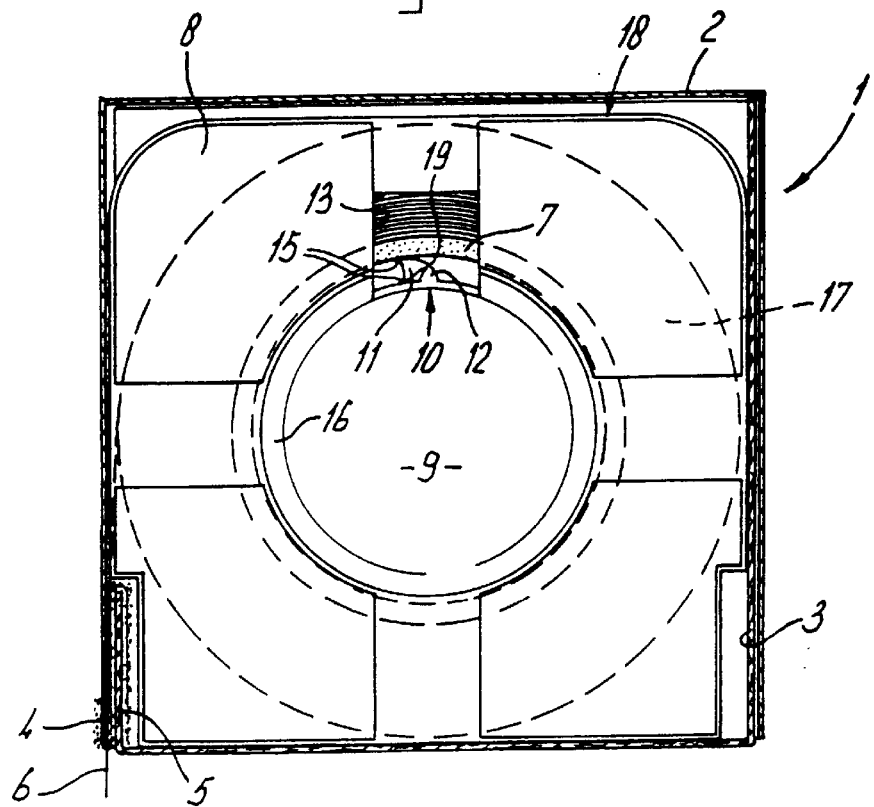
FIG. 2 shows in side view the holder per FIG. 1.

In FIG. 2, the protective means 10 is seen better on enlarged scale. This protective means 10 comprises a base 12, by which it is fastened to the flange 18, in particular, on the protruding piece 9, and a tilting piece 11 and a hinge connection 19, by which the tilting piece 11 is fastened to the base 12.

Figure 3:
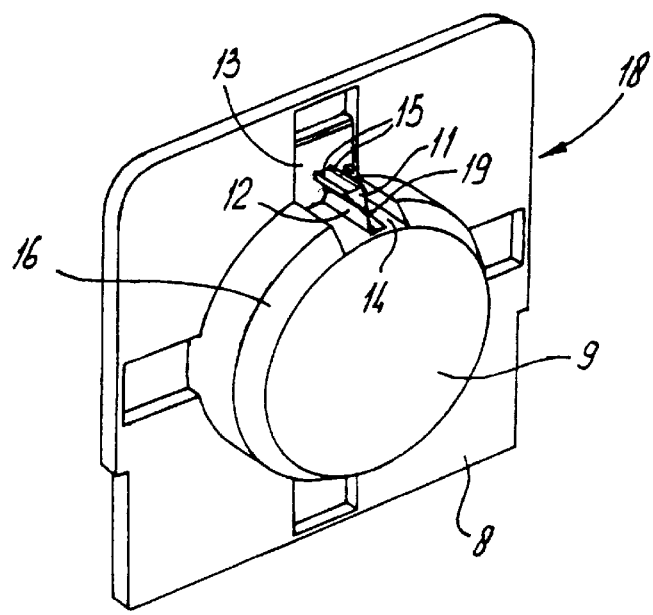
FIG. 3 shows in perspective view the flange per the present invention.

FIG. 3 clearly shows the cavities 14 at both ends of the base 12. The tilting piece 11 can be accommodated in these cavities when it is turned over via the hinge connection 19 by the exerting of a force on the lip 6 of the film material, by which the roll core 7 is rotated through a small angle against the force of the protective means 10, which is enough to turn over the tilting piece 11.

The tilting piece 11 contains two cutting edges 15, by which this piece 11 can cut into the material of the roll core 7 in order to realize a stronger engagement of the tilting piece 11 with the roll core 7.

FIG. 3 clearly shows that the protruding piece 9 of the flange 18 comprises a beveled surface 16, by which the flange, or the protruding piece 9 can be more easily placed in the cavity of the roll core 7 during assembly, in order to engage with the roll core 7.

FIGS. 1 and 2 indicate the protective means 10 in the condition after the breaking of the protection action. FIG. 3 indicates the protective means 10 in the condition prior to the breaking of the protection action.

Figure 4A:
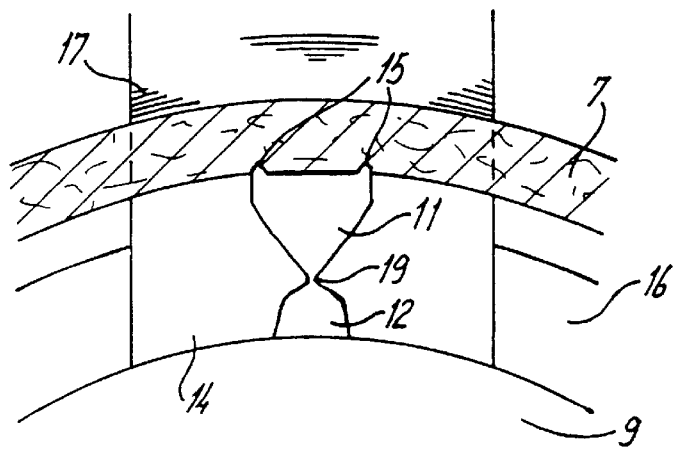
FIGS. 4a to 4c represent in detail the sequence of several stages of the protective means per the invention as the protection action is broken.
Figure 4B:
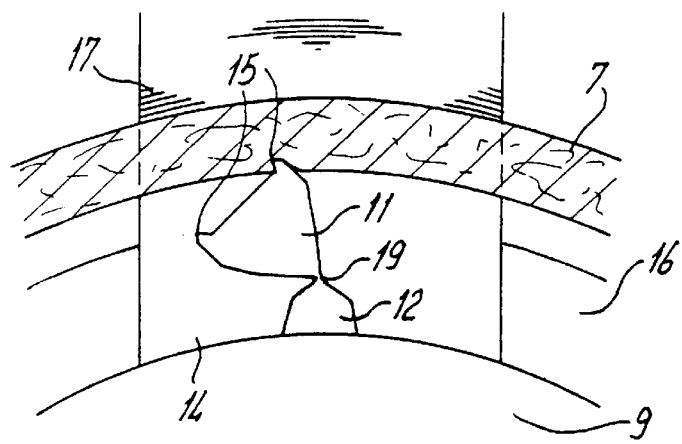
Figure 4C:
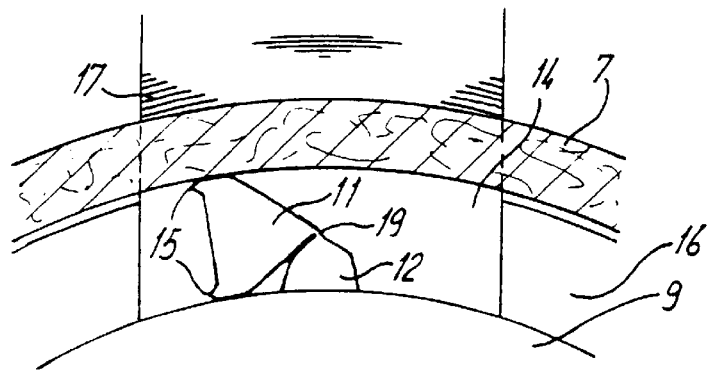

FIG. 4a represents the protective means in the protecting condition. The tilting piece 11 is located between the inside of the roll core 7 and the hinge connection 19 by which the tilting piece 11 is secured to the base 12. The roll core 7 lies against the protruding piece 9, at one end, and at the other it lies against the tilting piece 11. In this way, the roll core 7 is clamped with a slight tension against the protruding part 9 of the flange 8 (see FIG. 2 and compare FIG. 4a with 4c). In FIG. 4b, the protective means is shown in a condition during the tilting, after a pulling force has been exerted on the outermost layer of the roll 17 of film material in the direction in which the tilting piece 11 is tilted in FIG. 4b. FIG. 4c represents the protective means in the condition in which it has been completely tilted away and ends up in the cavity 14, so that the protective means 10 is no longer engaging with the roll core 7 and this roll core 7 is thus freed up to rotate, and thus the protection action is removed. In the condition per FIG. 4c, the protective means 10 and/or the tilting piece 11 does not block the rotational movement of the roll core 7; either in one direction, or in the other. The tilting piece 11 remains connected to the base 12 via the hinge connection 19. Later on, the tilting piece 11 can be again placed upright (as in FIG. 4a), in the event that the flanges are being reused.

What is claimed is:

1. A holder for holding a roll of film material comprising a core having an inner surface, the holder comprising at least one flange, said flange including a protruding part adapted to be inserted in said core and receive said core inner surface in rotational engagement, said protruding part having a circumferential peripheral surface, wherein the improvement comprises;

(a) a radially extending cavity in said protruding part through said circumferential peripheral surface;
   (b) a base in said cavity; and
   (c) a tilting part having a portion protruding radially from the circumferential peripheral surface and rotatably mounted on said base in said cavity, said tilting part rotatably movable between a first position wherein said part engages the inner surface of said core when said protruding part is inserted in the core, and a second position wherein said part does not engage the inner surface of the core when said protruding part is inserted in the core.

2. A holder according to claim 1 wherein the core has two ends and the holder comprises two flanges adapted to be inserted in each of the two core ends, each of said two flanges including the protruding part adapted to receive said core inner surface in rotational engagement, the cavity in said protruding portion, the base in said cavity, and the tilting part rotatably mounted on said base in said cavity, wherein said tilting part is movable between said a first position and said second position.

3. A holder according to claim 1 wherein the tilting part is hingedly mounted on the base with a hinge and wherein the hinge has a resistance sufficient to resist accidental rotation of the tilting part during handling of the film holder when the flange protruding part is inserted in the core and the tilting part is in the first position.

4. A holder according to claim 1 wherein the cavity has a depth sufficient to fully contain the tilting part when the tilting part is in the second position so that the tilting part does not extend above the surface of the flange protruding part.

5. A holder according to claim 1 wherein the portion of the tilting part has at least one cutting edge which engages the inner surface of the core when the flange protruding part is inserted in the core and the tilting part is in the first position.

6. A holder according to claim 5 wherein the portion of the tilting part has two parallel, spaced, cutting edges which engage the inner surface of the core when the flange protruding part is inserted in the core and the tilting part is in the first position.

* * * * *